US008830221B2

(12) United States Patent
Yeh et al.

(10) Patent No.: US 8,830,221 B2
(45) Date of Patent: Sep. 9, 2014

(54) IMAGE PRIVACY PROTECTING METHOD

(75) Inventors: Chao-Wei Yeh, Hsin-Chu (TW); Chih-Hsiang Yang, Hsin-Chu (TW); Chien-Huang Liao, Hsin-Chu (TW); Wen-Hao Hsu, Hsin-Chu (TW)

(73) Assignee: Au Optronics Corp., Hsin-Chu (TW)

( * ) Notice: Subject to any disclaimer, the term of this patent is extended or adjusted under 35 U.S.C. 154(b) by 158 days.

(21) Appl. No.: 13/470,475

(22) Filed: May 14, 2012

(65) Prior Publication Data

US 2013/0100112 A1 Apr. 25, 2013

(30) Foreign Application Priority Data

Oct. 24, 2011 (TW) ............................ 100138588 A

(51) Int. Cl.

*G06F 3/038* (2013.01)
*G06F 3/041* (2006.01)
*G09G 3/36* (2006.01)

(52) U.S. Cl.

CPC .......... *G09G 3/3611* (2013.01); *G09G 2358/00* (2013.01); *G09G 2320/0285* (2013.01); *G09G 2320/068* (2013.01)
USPC .......................................... 345/213; 345/718

(58) Field of Classification Search

USPC ............. 345/76, 88, 581, 690, 691, 419, 211, 345/212, 213, 87, 89
See application file for complete search history.

(56) References Cited

U.S. PATENT DOCUMENTS 7,453,429 B2 11/2008 Chang et al.
2005/0212448 A1 9/2005 Shibusawa et al.
2007/0091037 A1 4/2007 Lee
2008/0007684 A1 1/2008 Kim
2008/0180377 A1 7/2008 Meng et al.
2010/0010366 A1 1/2010 Silberstein
2011/0141127 A1 * 6/2011 Chang ........................... 345/581
2012/0013825 A1 * 1/2012 Sugiura et al. .................. 349/76

FOREIGN PATENT DOCUMENTS

| | | | |
|---|---|---|---|
| CN | 101916014 | A | 12/2010 |
| CN | 102110402 | A | 6/2011 |
| TW | 200414804 | A | 8/2004 |
| TW | 200827829 | A | 7/2008 |
| TW | 201120502 | A | 6/2011 |

OTHER PUBLICATIONS

State Intellectual Property Office of the People's Republic of China, "Office Action", Aug. 1, 2013.
Taiwan Patent Office, "Office Action", Dec. 9, 2013.

* cited by examiner

*Primary Examiner* — Michael Faragalla
(74) *Attorney, Agent, or Firm* — WPAT, PC; Justin King

(57) ABSTRACT

An image privacy protecting method is provided. Positions of a privacy protecting region and a normal display region are acknowledged first. When a frame of image is processed, a first image data will be displayed in the privacy protecting region is processed in a narrow viewing mode to obtain a narrow viewing driving data, and a second image data will be displayed in the normal display region is processed in a wide viewing mode to obtain a wide viewing driving data. Finally, display operations are performed in the privacy protecting region and the normal display region respectively according to the narrow viewing driving data and the wide viewing driving data.

8 Claims, 8 Drawing Sheets

Viewing angle is 90°

Viewing angle is 45°

Front-view

Viewing angle is 0°

Viewing angle is 270°

Viewing angle is 315°

IMAGE PRIVACY PROTECTING METHOD

TECHNICAL FIELD

The disclosure relates to image privacy protecting methods, and more particularly to a partial image privacy protecting method.

BACKGROUND

Generally, a display device is designed with a display effect of wide viewing angle so as to display images facilitating multi-viewers to watch together. However, sometimes or some occasions, when reading confidential information or inputting a password, the display effect of wide viewing angle would cause the confidential information or password to be peeped and thereby being leaked. In order to satisfy the two different requirements of multi-viewers watching and of processing confidential information in public, a display device with adjustable viewing angle which can be switched between a wide viewing angle mode and a narrow viewing angle mode has gradually become a main stream in the display device market.

Privacy protecting mechanisms in the conventional display devices generally can be classified into several types such as direct addition of privacy filter, backlight source control cooperative with additionally added viewing angle control module, and so on. However, the conventional privacy protecting mechanisms would achieve the privacy protecting effect at the expense of display quality, optical character, thickness and weight, and moreover the viewing angle of a valid user may be limited more or less.

Referring to FIG. 1, when a user is viewing a display device 10, the user usually needs to extend his/her field of vision to left and right sides respectively with certain angles (for example, angles θ1 and θ2), so that the whole display device 10 can completely come into his/her field of vision. However, since the principle of the privacy protecting mechanism is to cause image changes in side-view, the user would suffer from the influence of the privacy protecting mechanism more or less when watching the display device 10 in non-front-view and thereby would watch special images such as mosaic caused by the privacy protecting mechanism in the displayed image, the reading or working smoothness is influenced as a result. As shown in FIG. 1, in the display areas C1 and C2 corresponding to viewing angles greater than 10°, the user may feel image interference patterns caused by the privacy protecting mechanism.

For improving the utilization quality of display device, the designer must give a consideration to both the utilization smoothness of user and the achievement of privacy protecting function.

SUMMARY

The disclosure provides an image privacy protecting method, which is used for protecting displayed data and providing a better edge display quality.

More specifically, in an image privacy protecting method in accordance with an exemplary embodiment of the disclosure, the positions of a privacy protecting region and a normal display region are determined first. A first image data will be displayed in the privacy protecting region is processed in a narrow viewing mode to obtain a narrow viewing driving data, and a second image data will be displayed in the normal display region is processed in a wide viewing mode to obtain a wide viewing driving data. Finally, the narrow viewing driving data is displayed in the privacy protecting region and the wide viewing driving data is displayed in the normal display region.

In short, the present disclosure adopts the image privacy protecting only in a part of the display screen and adopts a normal display manner in the other part of the display screen, so that except the image displayed in the partial area being privacy protected, the image displayed in the other area is a normal image, and thus the user no longer suffer from the unexpected interference pattern when viewing images.

Moreover, in another image privacy protecting method in accordance with an exemplary embodiment of the disclosure adapted for a display system, a position of a first privacy protecting region in the display system and a position of a second privacy protecting region in the display system are determined first. A first image data will be displayed in the first privacy protecting region are processed in a first narrow viewing mode to obtain a first narrow viewing driving data and a second image data will be displayed in the second privacy protecting region are processed in a second narrow viewing mode to obtain a second narrow viewing driving data. Afterwards, display operations are performed in the first privacy protecting region and the second privacy protecting region respectively according to the first narrow viewing driving data and the second narrow viewing driving data. Accordingly, the brightness of the whole image is more even.

BRIEF DESCRIPTION OF THE DRAWINGS

The disclosure will become more readily apparent to those ordinarily skilled in the art after reviewing the following detailed description and accompanying drawings.

DETAILED DESCRIPTION OF EMBODIMENTS

The disclosure will now be described more specifically with reference to the following embodiments. It is to be noted that the following descriptions of embodiments of this disclosure are presented herein for purpose of illustration and description only. It is not intended to be exhaustive or to be limited to the precise form disclosed.

Figure 1:
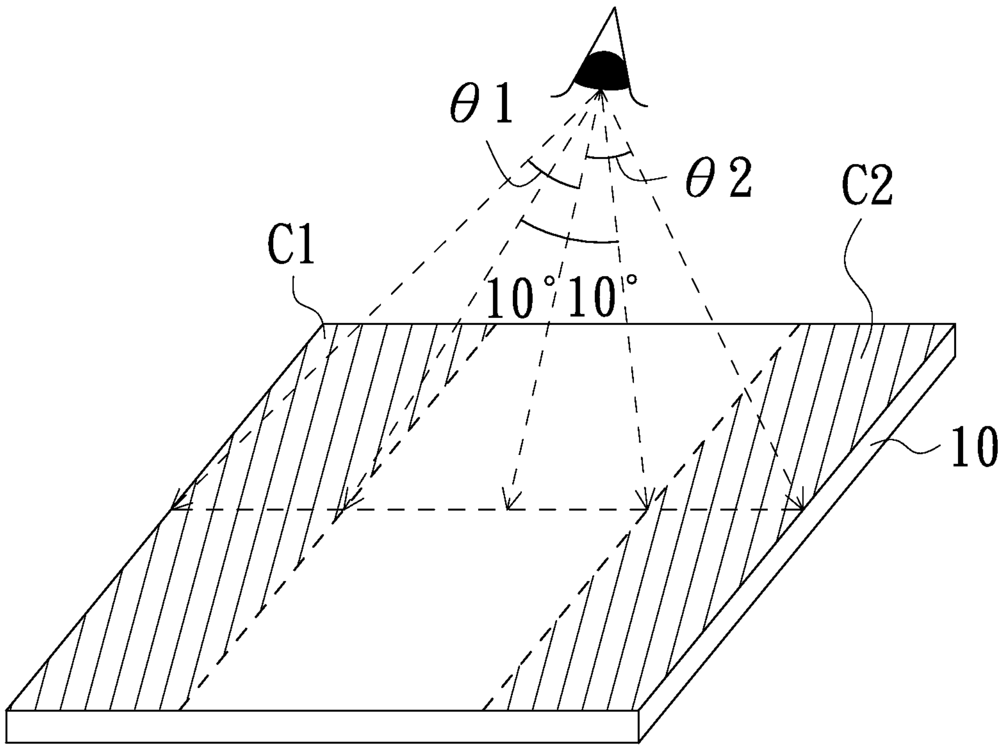
FIG. 1 (Related Art)
FIG. 1 is a schematic view of viewing angles and images being influenced by a privacy protecting mechanism when a user viewing a display device.
Figure 2:
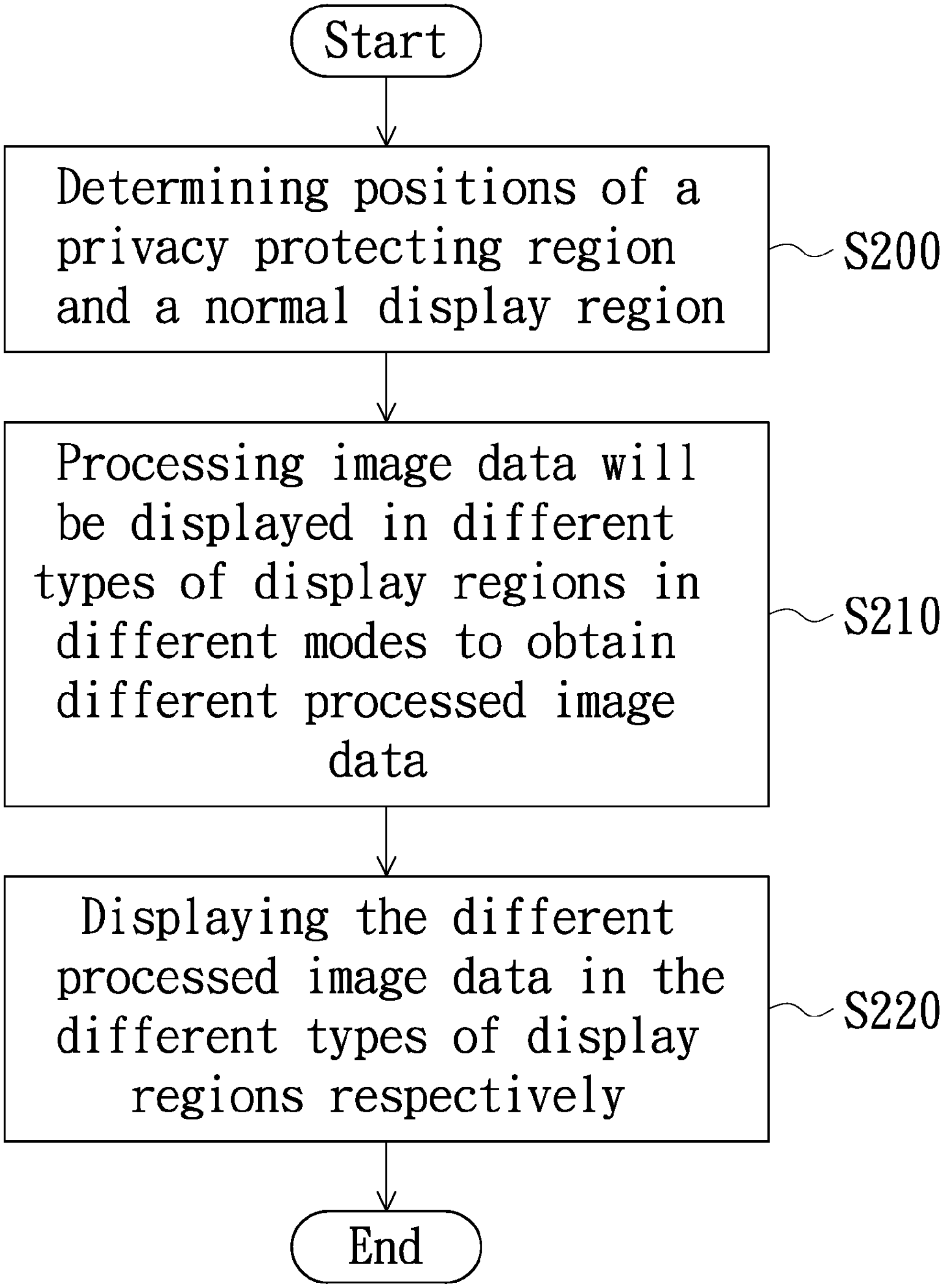
FIG. 2 is flowchart of implementation steps for an image privacy protecting method in accordance with an exemplary embodiment.

FIG. 2 is a flowchart of implementation steps for an image privacy protecting method in accordance with an exemplary embodiment. The image privacy protecting method can be used in a display system having a display screen. The display system can be a single display screen, a display device can work independently, or a multi-element system including a display screen and a computer host externally connected to the display screen for providing display data.

In the present exemplary embodiment, positions of a privacy protecting region and a general display region are determined first (step S200). After the positions of the two types of display regions (i.e., the privacy protecting region and the general display region) are determined, during a frame of image is processed, an image data will be displayed in the privacy protecting region and an image data will be displayed in the normal display region are desired to be respectively processed in different modes to obtain corresponding processed image data (step S210). When the driving data are obtained after the step S210, the display system can perform corresponding driving operations in the respective display regions according to the corresponding image data, that is, displaying the different processed image data in the different types of display regions respectively (step S220).

In detail, the so-called privacy protecting region represents that information displayed in such display region is expected to be achieved with a privacy protecting effect. Contradistinctively, the so-called normal display region represents that information displayed in such display region is expected to be in a normal/general mode without the need of privacy protection. For the convenience of enough flexibility in design, a specific judgment mechanism may be configured in different kinds of display systems, for example, the judgment mechanism is a resident program in a computer host or some firmware program combined with hardware, etc., and such judgment mechanism can be used for detecting some special situations to determine the positions of respective display regions. The special situations for example include a specific font, executing a specific program or an instruction containing a special control string, etc.

For example, once the display system finds any image data will be displayed with a predetermined privacy font, a display region for displaying the image data will be displayed with the predetermined privacy font would be set as a privacy protecting region. Possibly, when the display system detects that a preset program starts to be executed, the interior area of a visual window opened by executing the preset program would be set as a privacy protecting region. In addition, the other display region on the display screen can be directly set as a normal display region, or the normal display region is determined by other condition instead. Conversely, the region corresponding to the above any special situation can be set as a normal display region instead and the other region is directly set as a privacy protecting region, or the privacy protecting region is determined by other condition instead.

If simpleness and convenience are considered, the display screen can be virtually divided into several fixed regional blocks, and some of the fixed regional blocks can be directly set as a privacy protecting region while the other of the fixed regional blocks can be directly set as a normal display region.

After the positions of the privacy protecting region and the normal display region are acknowledged, corresponding image processing operations can be started to perform. It is explained that, a type judgment/determination for display regions can be performed in each frame, at regular time intervals, in each boot, when inputting a specific instruction or manufacturing, which does not hinder the subsequent image processing procedure.

During image processing, an image data will be displayed in the privacy protecting region (hereinafter referred to as "first image data") is processed in a narrow viewing mode to obtain a corresponding narrow viewing driving data, and an image data will be displayed in the normal display region (hereinafter referred to as "second image data") is processed in a wide viewing mode to obtain a corresponding wide viewing driving data.

Figure 3:
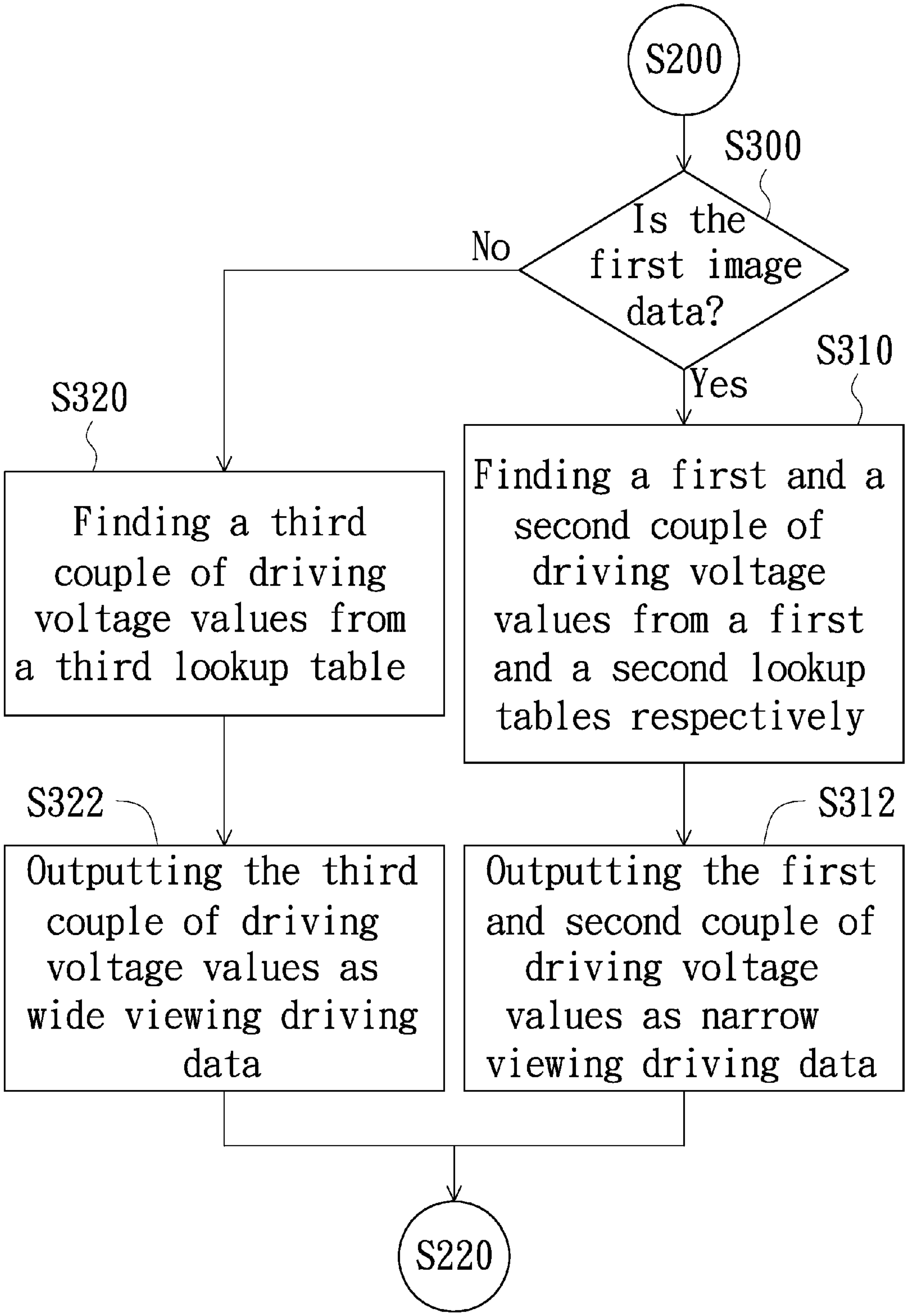
FIG. 3 is a flowchart of implementation steps for image processing in accordance with an exemplary embodiment.

FIG. 3 is a flowchart of implementation steps for image processing in accordance with an exemplary embodiment. As shown in FIG. 3, after the positions of different types of display regions are acknowledged in the step S200, the positions of the respective display regions are taken as the basis for determining the processing manners of the respective image data, and in the present exemplary embodiment the purpose is achieved by judging that if the image data is the first image data (step S300). If the judging result in the step S300 is true, which represents the image data would be displayed in the privacy protecting region, and then two couples of corresponding driving voltage values (hereinafter referred to as "first couple of driving voltage values and second couple of driving voltage values") would be found from two pre-prepared lookup tables (hereinafter referred to as "first lookup table and second lookup table") (step S310) and the found first and second couple of driving voltage values are outputted as the foregoing narrow viewing driving data (step S312). On the contrary, if the judging result in the step S300 is false, which represents the image data would be displayed in the normal display region, and then a couple of corresponding driving voltage values (hereinafter referred to as "third couple of driving voltage values") are found from another pre-prepared lookup table (hereinafter referred to as "third lookup table") (step S320) and the found third couple of driving voltage values are outputted as the foregoing wide viewing driving data (step S322).

In the present exemplary embodiment, the first lookup table, the second lookup table, and the third lookup table are respectively built according to display requirements of narrow viewing mode and wide viewing mode, and therefore the contents of the first lookup table, the second lookup table, and the third lookup table are not completely the same.

For more clearly explaining relevant content, detailed description will be made below with reference to FIG. 4.

Figure 4:
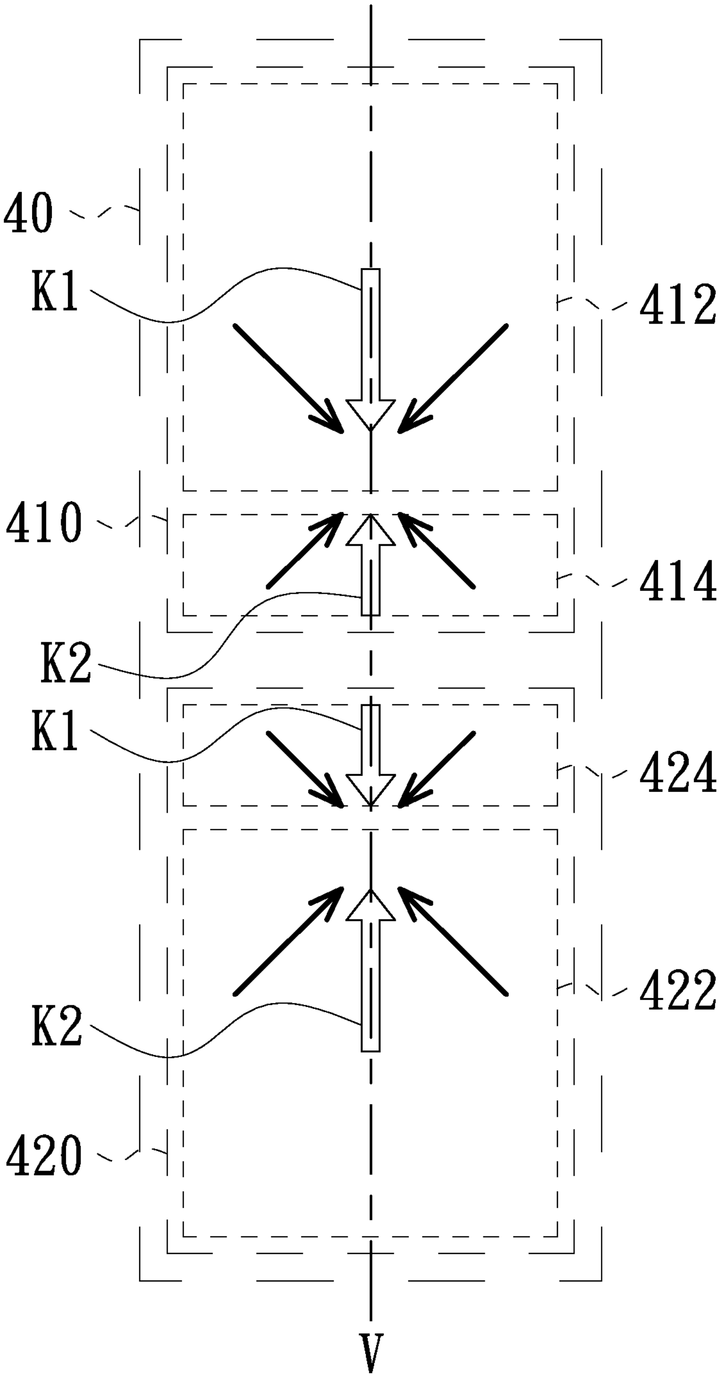
FIG. 4 is a schematic structural view of a sub-pixel in a display screen adopted by the image privacy protecting method in accordance with an exemplary embodiment.

FIG. 4 is a schematic structural view of a sub-pixel in a display screen adopted by an image privacy protecting method in accordance with an exemplary embodiment. Specifically, FIG. 4 shows a structure of a single sub-pixel 40 in the display screen for the purpose of illustration. A general display screen generally uses three sub-pixels respectively representing three primary colors to constitute a single pixel and further uses multiple pixels arranged in matrix to compose a display element thereof, such technology is well-known the skilled person in the art and thus will not be repeated herein.

In the present exemplary embodiment, one sub-pixel 40 includes a first pixel electrode area 410 and a second electrode area 420, solid arrows represent inclining directions of liquid crystal molecules, and void arrows K1 and K2 respectively represent a vertically downward viewing angle direction and a vertically upward viewing angle direction. As shown in FIG. 4, the luminous flux of the sub-pixel 40 in the viewing angle direction K1 is approximately equivalent to the luminous flux of the sub-pixel 40 in the viewing angle direction K2. However, as far as the first pixel electrode area 410 is individually concerned, since a first part 412 is designed to be have a larger area than a second part 414, when only the first pixel electrode area 410 is turned on, the luminous flux in the viewing angle direction K1 is greater than the luminous flux in the viewing angle direction K2. As far as the second pixel electrode area 420 is individually concerned, since a third part 422 is designed to be have a larger area than a fourth part 424, when only the second pixel electrode area 420 is turned on, the luminous flux in the viewing angle direction K1 is less than the luminous flux in the viewing angle direction K2. In other words, an unbalanced vertical transmittance in this situation is caused by the different sizes between the area for providing the luminous flux in the viewing angle direction K1 and the area for providing the luminous flux in the viewing angle direction K2.

Figure 5:
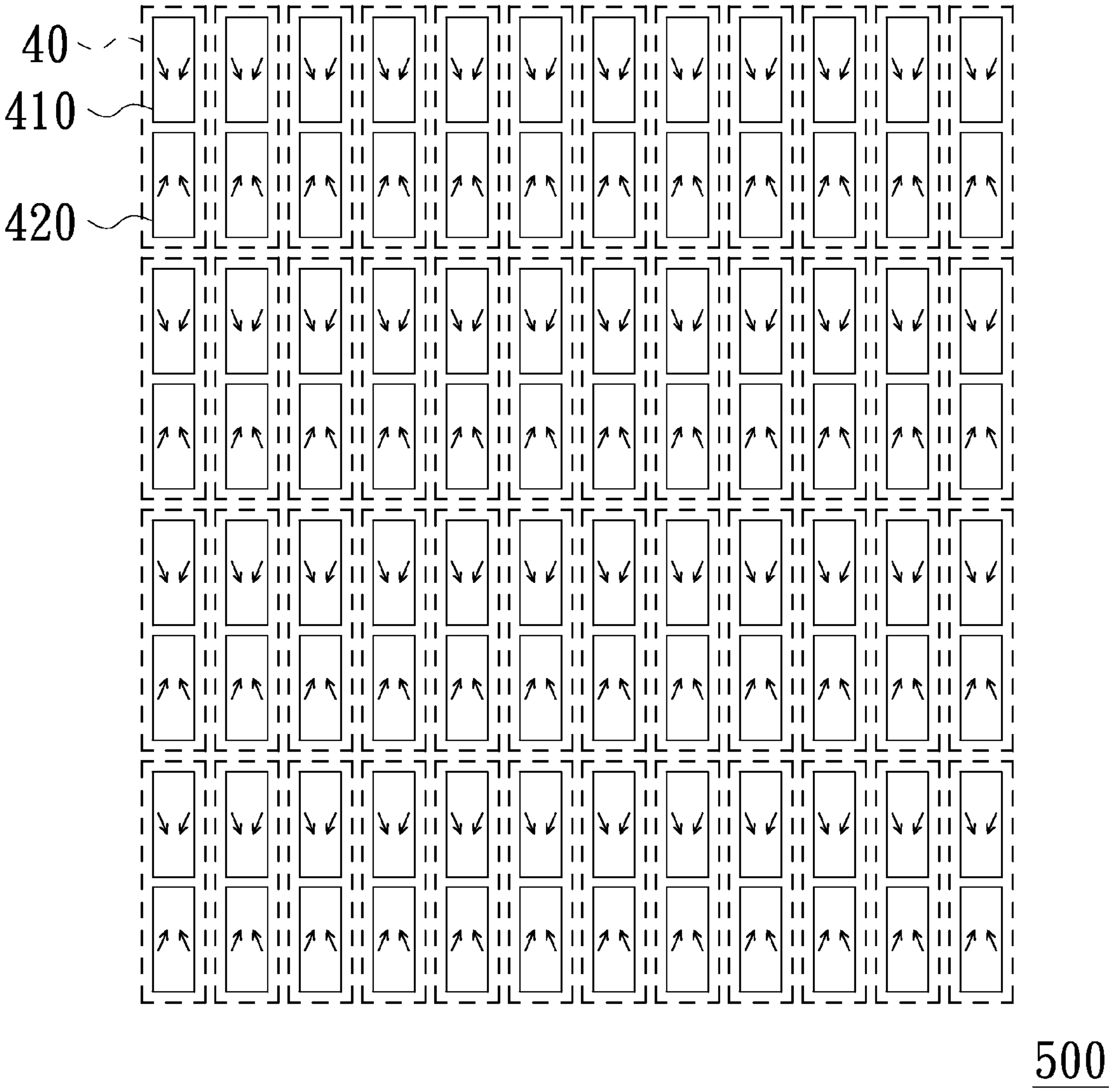
FIG. 5 is a schematic view of driving luminance of sub-pixels in a wide viewing mode.
Figure 6:
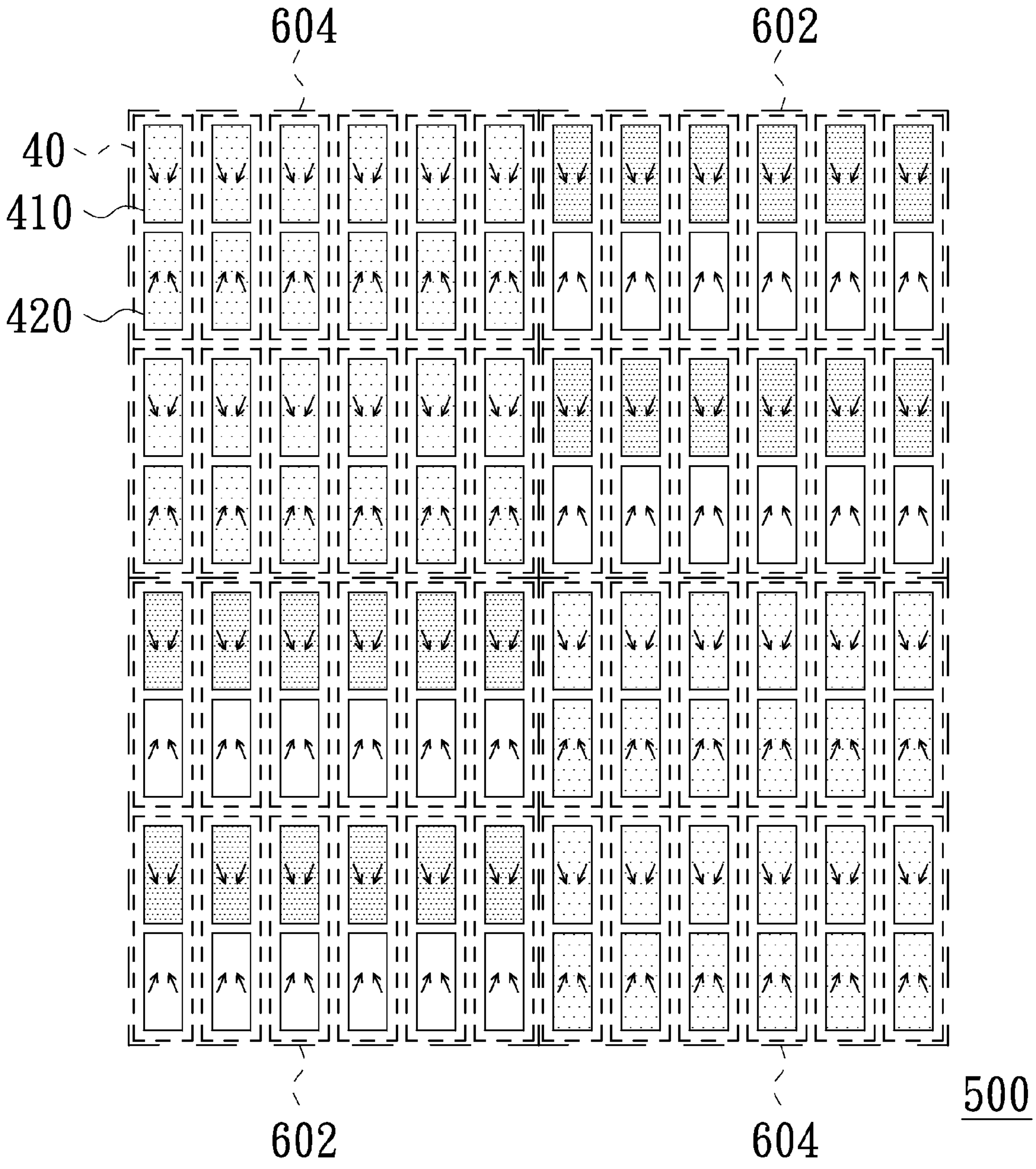
FIG. 6 is a schematic view of driving luminance of sub-pixels in a narrow viewing mode.

In the following, actual driving modes of the present disclosure and an interior structure of matched display panel will be described in detail below with reference to FIGS. 5 and 6. In particular, FIG. 5 is a schematic view of driving luminance of sub-pixels in a wide viewing mode, and FIG. 6 is a schematic view of driving luminance of sub-pixels in a narrow viewing mode. As shown in FIGS. 5 and 6, the display panel 500 includes multiple sub-pixels 40 as shown in FIG. 4, and each sub-pixel 40 includes a first pixel electrode area 410 and a second pixel electrode area 420. Vectors of the viewing angle directions K1 and K2 of the first pixel electrode area 410 and the second pixel electrode area 420 are designed to be non-identical, and the sub-pixels 40 in the display panel 500 are arranged in matrix as shown in FIGS. 5 and 6. In the exemplary embodiment shown in FIG. 5, in each of the sub-pixels 40, a driving voltage of the first pixel electrode area 410 is approximately equal to or less than a driving voltage of the second pixel electrode area 420, so as to achieve a good wide viewing character.

Figure 7A:
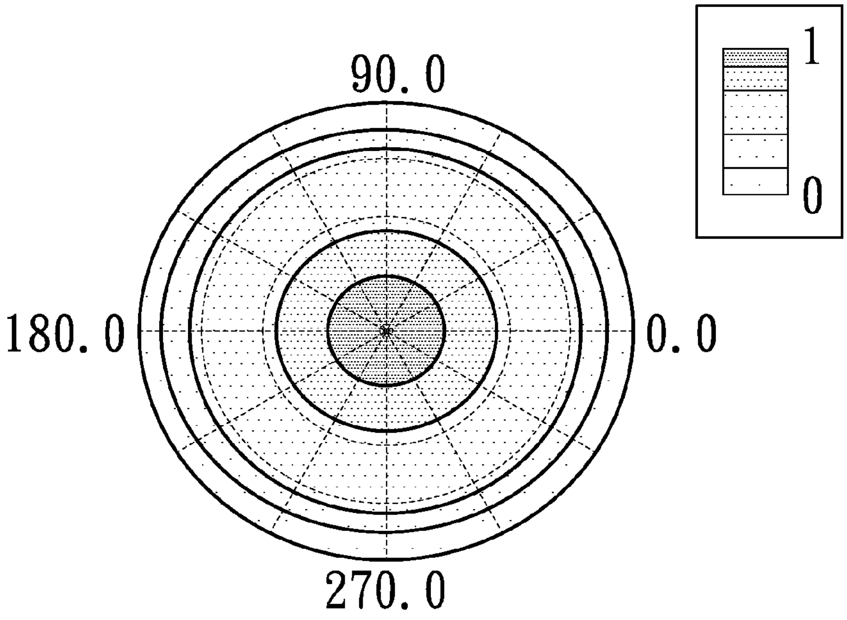
FIG. 7A is a full viewing angle luminance distribution diagram of the second regions as shown in FIG. 6.
Figure 7B:
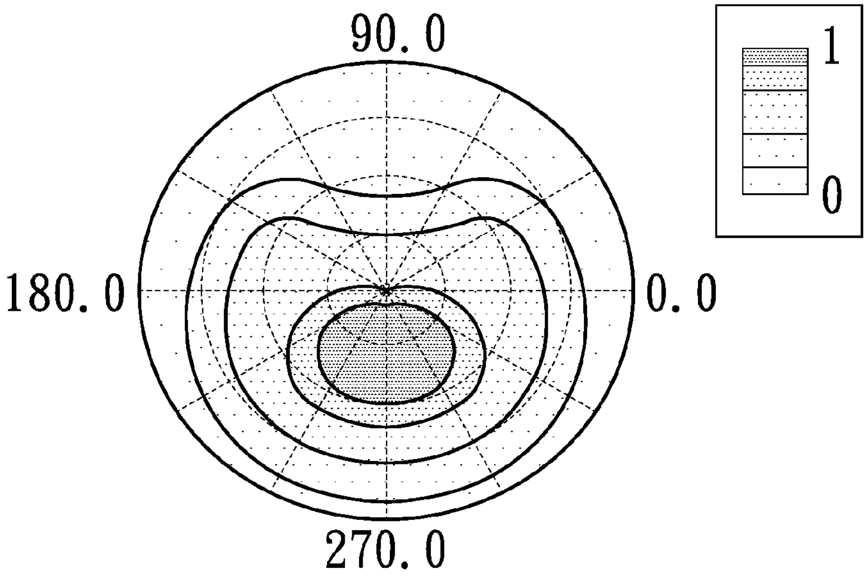
FIG. 7B is a full viewing angle luminance distribution diagram of the first regions as shown in FIG. 6.
Figure 8A:
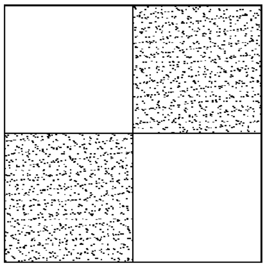
FIGS. 8A~8F are schematic views of luminances of a privacy protecting pattern of four squares in different viewing angles.
Figure 8B:
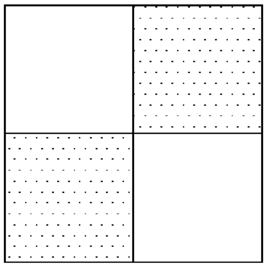
Figure 8C:
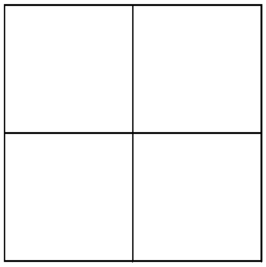
Figure 8D:
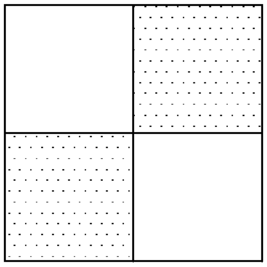
Figure 8E:
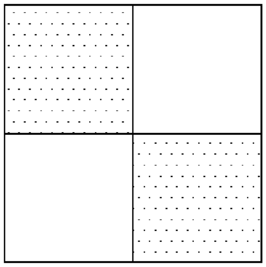
Figure 8F:
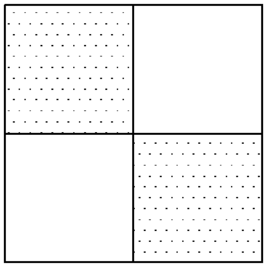

Contradistinctively, as seen from the exemplary embodiment shown in FIG. 6, in the narrow viewing mode, the display panel 500 at least is divided into first regions 602 and second regions 604. In the first regions 602, the driving voltage of each the first pixel electrode area 410 is configured to be less than the driving voltage of each the second pixel electrode area 420. In the second regions 604, the driving voltage of the first pixel electrode area 410 is slightly less than or equal to the driving voltage of the second pixel electrode area 420 in each of the sub-pixels 40. A driving voltage ratio between the first pixel electrode area 410 and the second pixel electrode area 420 in the second regions 604 is not equal to a driving voltage ratio between the first pixel electrode area 410 and the second pixel electrode area 420 in the first regions 602. As a result, the divided regions with different driving voltage ratios would have a same luminance in front-view. However, since the different driving voltage ratios, the divided regions have different luminance distributions in other viewing angles, and the luminance distributions in the other viewing angles are shown in FIGS. 7A and 7B. FIG. 7B is a full viewing angle luminance distribution diagram of the first regions 602 of FIG. 6, and FIG. 7A is a full viewing angle luminance distribution diagram of the second regions 604 of FIG. 6. As seen from FIGS. 7A and 7B, on the prerequisite of same luminances in front-view, a luminance in wide viewing angle illustrated in FIG. 7A is higher than that illustrated in FIG. 7B. If a privacy protecting pattern composed by simple four squares is used to illustrate resultant luminance differences in different viewing angles, the results can refer to FIGS. 8A-8F.

The driving modes will be described in detail below according to the using situation of the above design, but it is only an example for the purpose of illustration. In practical application, it may be other design structure instead such as a horizontal-asymmetrical structure, or all-pixel-symmetric structure, etc.

Accordingly, the following driving modes are proposed, e.g.:

(1) In the whole normal display region, the driving voltage of each the first pixel electrode area is configured to be less than or equal to the driving voltage of each the second pixel electrode area so as to perform a wide viewing driving mode; and in the whole privacy protecting region, different driving voltage ratios being used to drive the sub-pixels in the first regions and the second regions so as to perform a narrow viewing driving mode. Therefore, the privacy protecting region can achieve the display effect of narrow viewing angle, and the normal display region can achieve the display effect of wide viewing angle. However, since the transmittance is different in each of regions, the uneven brightness of the narrow viewing display region and the wide viewing display region would be perceived when the user watches the display screen in front-view.

(2) In the whole normal display region, the driving voltage of each the first pixel electrode area is configured to be less than the driving voltage of each the second pixel electrode area so as to perform a narrow viewing driving mode (i.e., similar to the driving mode of the first regions 602), so that the normal display region in this situation can be considered as another type of privacy protecting region in some degree due to the adoption of narrow viewing driving mode; in the privacy protecting region, the manner of dividing into multiple regions and using two different driving voltage ratios to generate contrast between bright and dark is adopted so as to perform another narrow viewing driving mode (i.e., similar to the hybrid driving mode of the first and second regions 602, 604 as a whole). More specifically, the two narrow viewing driving modes used in the whole image display region may be that: (a) in the edge area (i.e., a normal display region) of the display screen, turning on each the second pixel electrode area and turning off each the first pixel electrode area of all the sub-pixels; and (b) dividing the central area (i.e., a privacy protecting region) of the display screen into multiple regions and using different driving voltage ratios to turn on the first pixel electrode areas and the second pixel electrode areas of the sub-pixels in different divided regions. Accordingly, the whole image display region can achieve a display effect of narrow viewing angle and a better privacy protecting effect in the central region of the display screen. Meanwhile, owing to the image display regions respectively adopted with the two narrow viewing driving modes have the same highest display brightness (equivalent to turning on the second pixel electrode area and turning off the first pixel electrode area), the brightness of the whole image is more even than that in the previous one.

In practical application, the driving modes provided in the foregoing exemplary embodiments can further be used together with a head tracking system or eye tracking system, by detecting a relative position between a specific object (generally human eyes or head) and the display system in real-time, and then using the detected relative position together with the different designs of the pixel viewing angle areas to determine how to compensate the image data displayed in the privacy protecting region, the situation of the valid user suffers from the unexpected interference pattern caused by being unable to watch the privacy protecting region in front-view can be avoided.

In summary, the present disclosure adopts the image privacy protecting only in a part of the display screen and adopts the normal display in the other part of the display screen, so that except the image displayed in the region being privacy protected, the image displayed in the other region is a normal image and thus the user no longer suffers from the unexpected interference pattern when viewing images.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image privacy protecting method adapted for a display system, the image privacy protecting method comprising the steps of:

determining a position of a privacy protecting region in the display system;

determining a position of a normal display region in the display system;

finding at least a first and a second couple of driving voltage values of a first pixel electrode area and a second pixel electrode area of sub-pixel in the privacy protecting region corresponding to a first image data to be displayed in the privacy protecting region in a narrow viewing mode from a first and a second lookup tables, wherein the first couple of driving voltage values have a different driving voltage ratio with respect to the second couple of driving voltage values;

finding a third couple of driving voltage values of the first pixel electrode area and the second pixel electrode area of sub-pixel in the normal display region corresponding to a second image data to be displayed in the normal display region in a wide viewing mode from a third lookup table, wherein the contents of the first lookup table, the second lookup table and the third lookup table are not completely the same;

using the first and second couple of driving voltage values as a narrow viewing driving data; and using the third couple of driving voltage values as a wide viewing driving data; and displaying the narrow viewing driving data in the privacy protecting region and displaying the wide viewing driving data in the normal display region.

2. The image privacy protecting method according to claim 1, wherein the step of determining a position of a privacy protecting region in the display system comprises:

setting a display region for displaying an image data which will be displayed with a predetermined privacy font as the privacy protecting region.

3. The image privacy protecting method according to claim 1, wherein the step of determining a position of a privacy protecting region comprises:

setting an interior region of a window opened by executing a preset program as the privacy protecting region.

4. The image privacy protecting method according to claim 1, wherein the step of determining a position of a privacy protecting region comprises:

setting a fixed block on a display screen of the display system as the privacy protecting region.

5. The image privacy protecting method according to claim 1, wherein the privacy protecting region is driven in a hybrid mode with driving modes of sub-pixel being wholly turned on and sub-pixel being partially turned on.

6. The image privacy protecting method according to claim 1, further comprising:

detecting a relative position of a specific object and the display system; and compensating the first image data according to the detected relative position.

7. An image privacy protecting method adapted for a display system, the image privacy protecting method comprising the steps of:

determining a position of a first privacy protecting region in the display system;

determining a position of a second privacy protecting region in the display system;

finding at least a first and a second couple of driving voltage values of a first pixel electrode area and a second pixel electrode area of sub-pixel in the first privacy protecting region corresponding to a first image data to be displayed in the first privacy protecting region in a first narrow viewing mode from a first and a second lookup tables, wherein the first couple of driving voltage values have a different driving voltage ratio with respect to the second couple of driving voltage values;

finding a third couple of driving voltage values of the first pixel electrode area and the second pixel electrode area of sub-pixel in the second privacy protecting region corresponding to a second image data to be displayed in the second privacy protecting region in a second narrow viewing mode from a third lookup table, wherein the contents of the first lookup table, the second lookup table and the third lookup table are not completely the same;

using the first and second couple of driving voltage values as a first narrow viewing driving data; and using the third couple of driving voltage values as a second narrow viewing driving data; and performing display operations in the first privacy protecting region and the second privacy protecting region respectively according to the first narrow viewing driving data and the second narrow viewing driving data.

8. The image privacy protecting method according to claim 7, wherein the coupled driving voltage values found from the first lookup table are the same as that in the third lookup table.

* * * * *